United States Patent
Wulff

(10) Patent No.: US 10,319,204 B1
(45) Date of Patent: Jun. 11, 2019

(54) SYSTEMS AND METHODS FOR RETRACING SHRINK EVENTS

(71) Applicant: Zebra Technologies Corporation, Lincolnshire, IL (US)

(72) Inventor: Thomas E. Wulff, Brookhaven, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 15/948,133

(22) Filed: Apr. 9, 2018

(51) Int. Cl.
*G06K 9/00* (2006.01)
*G08B 13/24* (2006.01)
*G06K 7/10* (2006.01)

(52) U.S. Cl.
CPC ..... *G08B 13/2462* (2013.01); *G06K 7/10475* (2013.01)

(58) Field of Classification Search
CPC .............. G08B 13/2462; G08B 13/196; G08B 13/19602; G06K 7/10475; G06Q 30/0609
See application file for complete search history.

(56) References Cited

U.S. PATENT DOCUMENTS

| | | | | |
|---|---|---|---|---|
| 2003/0107650 | A1* | 6/2003 | Colmenarez | G08B 13/19602 348/150 |
| 2004/0111454 | A1* | 6/2004 | Sorensen | G06Q 30/02 708/200 |
| 2007/0182818 | A1* | 8/2007 | Buehler | G08B 13/19602 348/143 |
| 2007/0279214 | A1* | 12/2007 | Buehler | G08B 13/19615 340/521 |
| 2013/0226655 | A1* | 8/2013 | Shaw | G06F 17/5009 705/7.29 |
| 2017/0323359 | A1* | 11/2017 | Dey | G07G 1/0072 |
| 2017/0323376 | A1* | 11/2017 | Glaser | G06Q 30/0643 |
| 2017/0354349 | A1* | 12/2017 | Mohapatra | H04W 4/70 |
| 2018/0253597 | A1* | 9/2018 | Kozakaya | G08B 13/196 |

* cited by examiner

*Primary Examiner* — Munear T Akki
(74) *Attorney, Agent, or Firm* — Yuri Astvatsaturov

(57) ABSTRACT

In an embodiment, the present invention is a shrink event detection system for use within a venue. The system includes a server associated with a venue containing a plurality of items, the server including one or more processors, and a shrink event detection subsystem. The shrink event detection subsystem is operable to: detect a theft event of a stolen item; backtrack from the theft event of the stolen item to recognize at least one attribute related to the theft event; and record the at least one attribute in a tracking database, the tracking database being accessible by the server. The system is configured such that the server, via the one or more processors, generates a shrink event template based at least in part of the at least one attribute in the tracking database.

8 Claims, 5 Drawing Sheets

SYSTEMS AND METHODS FOR RETRACING SHRINK EVENTS

BACKGROUND OF THE INVENTION

Theft or "shrink" events of products or items are a common concern for many retail venues. Typically, these events are dynamic in that different people attempt to shoplift different items at different times and by different means. Although security personnel are often trained to recognize telltale signs that a shrink event might be in progress, recognition of such signs is highly dependent on the attentiveness of the security individuals and his or her ability to recognize these signs. Additionally, an individual may be unable to recognize a potential shrink event if that event is out of the individual's view. For example, this can sometimes result if the security officer is attending to a separate matter and not monitoring the video feed directed at the potential perpetrator. Likewise, if the security officer is monitoring what he or she believes to be a potential shrink event, a simultaneously occurring shrink event could go unnoticed. Moreover, even if a security officer's view of the perpetrator is not necessarily obstructed, new patterns associated with past and on-going shrink events may develop that would not necessarily be obvious to the loss-prevention personnel. As a result, shrink events may ultimately go unrecognized, leading to item loss.

Accordingly, there is a need for improved system and methods directed towards recognizing potential shrink events.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
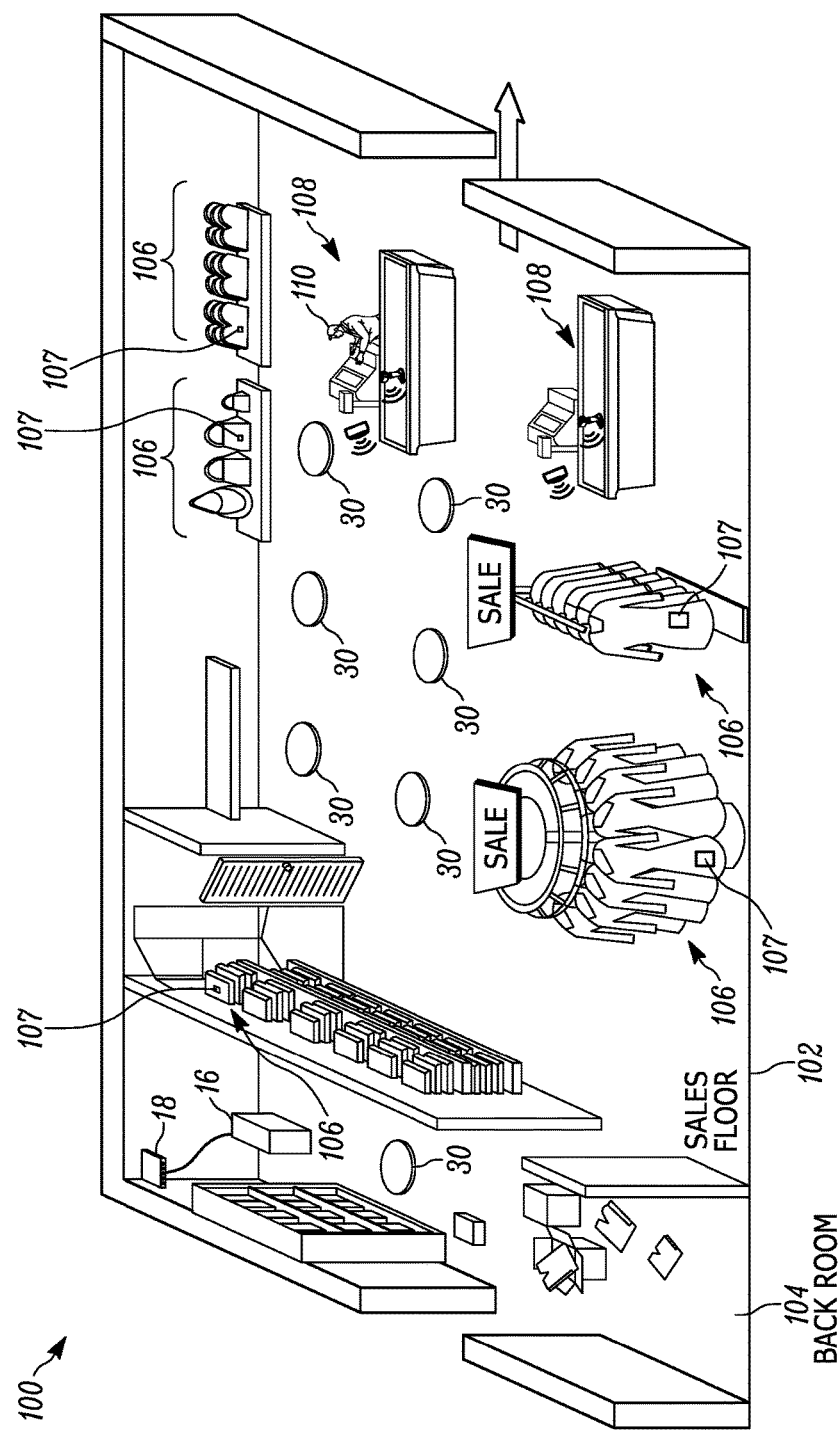
FIG. 1 illustrates an exemplary system disposed within an exemplary venue in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment, the present invention is a shrink event detection system for use within a venue. The system includes a server associated with a venue containing a plurality of items, the server including one or more processors, and a shrink event detection subsystem. The shrink event detection subsystem is operable to: detect a theft event of a stolen item; backtrack from the theft event of the stolen item to recognize at least one attribute related to the theft event; and record the at least one attribute in a tracking database, the tracking database being accessible by the server. The system is configured such that the server, via the one or more processors, generates a shrink event template based at least in part of the at least one attribute in the tracking database.

Referring now to the drawings, FIG. 1 illustrates a perspective view, as seen from above, of a retail venue 100 illustrating an arrangement for detection of theft events in accordance with the present disclosure. The venue 100 includes a sales floor 102 and a back room 104. The sales floor 102 is typically accessible to the general public and is stocked with various products (also referred to as items or retail items) 106 positioned in an accessible manner to be picked and bought by the customers (also referred to as consumers). Preferably, each product 106 includes an RFID tag 107 that is associated with the respective product and is attached thereto in some manner (e.g., sticker, tag, etc.) Upon picking any number of products 106 of choice, customers typically pass through one of the POS transaction station 108 where, with the assistance of a cashier 110, they finalize their purchase of the picked products 106.

Figure 3:
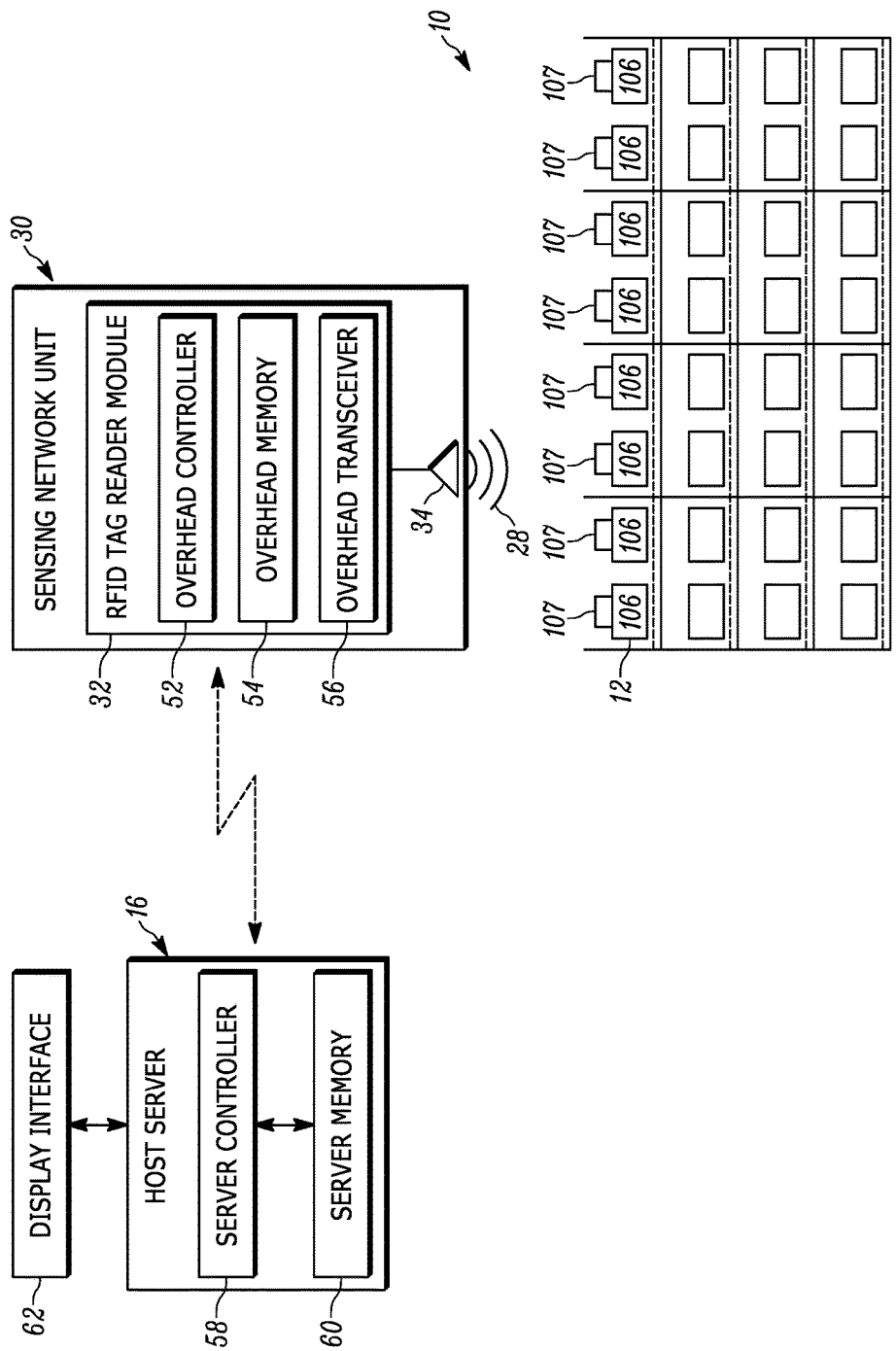
FIG. 3 illustrates a block communication diagram of some system components in accordance with an embodiment of the present disclosure.

To assist with tracking of customers and/or products and provide various metrics related thereto, a plurality of sensing network units 30 is also deployed in the venue 100. Sensing network units 30 are stationarily and fixedly mounted overhead, for example, on, or adjacent to, a ceiling. In some embodiments, the sensing network units 30 are installed every twenty to eighty feet or so in a grid pattern. A network computer or host server 16, typically locally located in a backroom 104 of the venue 10, comprises one or more computers and is in wired, wireless, direct, or networked communication with each sensing network unit 30 through a network switch 18. The server 16 may also be remotely hosted in a cloud server. The server 16 may include a wireless RF transceiver that communicates with each sensing network unit 30. For example, Wireless Fidelity (Wi-Fi) and Bluetooth® are open wireless standards for exchanging data between electronic devices. The server 16 can control each sensing network unit 30. As shown in FIG. 3, the server 16 includes a controller 58 and a memory 60, and a connected display interface 62. It should be understood that references to a server 16 providing configuration in a certain way shall also apply to the controller 58 providing configuration in the same/similar manner.

Figure 2:
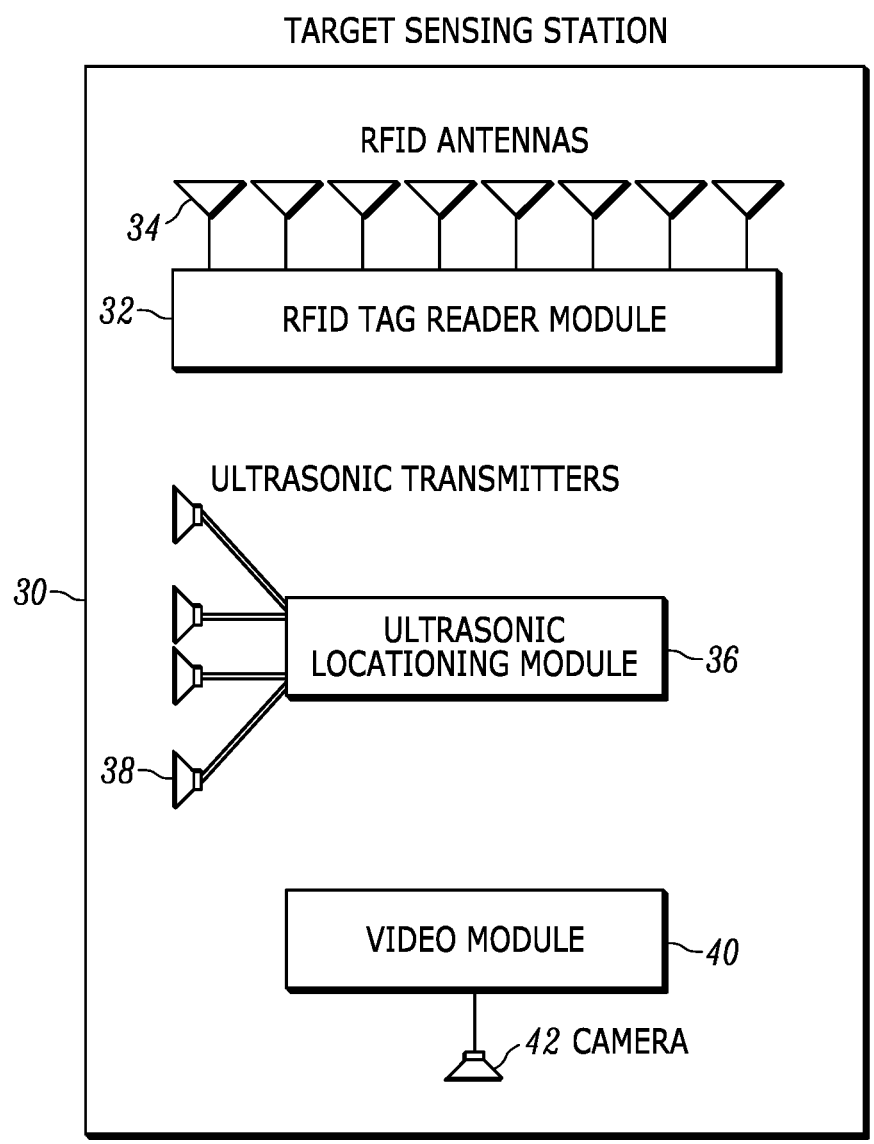
FIG. 2 illustrates a block diagram of a sensing network unit in accordance with an embodiment of the present disclosure.

The block diagram of FIG. 2 depicts various sensing systems that can be mounted in each overhead sensing network unit 30. One of these sensing systems is an RFID tag reader operative for reading the tags 107 over a corresponding plurality of coverage ranges or read-zones. More particularly, each overhead RFID reader includes an RFID tag reader module 32 that has, as shown in FIG. 3, a controller 52, a memory 54, and an RF transceiver 56, which are operatively connected to a plurality of RFID antenna elements 34, which are energized by the RFID module 32 to radiate an RF beam 28 over an antenna field pattern. The RF transceiver 56 is operated, under the control of the controller 52 and/or the controller 58, to transmit RF beams 28 to the tags 107, and to receive RF response signals from, the tags 107, thereby interrogating and processing the payloads of the tags 107 that are in its read-zone. The payload or captured target data identifies the tags 107 and their associated products.

Another of the sensing systems is an ultrasonic locationing system operative for locating an ultrasonic-capable mobile device by transmitting an ultrasonic signal to an ultrasonic receiver, e.g., a microphone, on a mobile device. A positive identification of a mobile device may be associated with a presence of a person (user). More particularly, the locationing system includes an ultrasonic locationing module 36 having control and processing electronics operatively connected to a plurality of ultrasonic transmitters, such as voice coil or piezoelectric speakers 38, for transmitting ultrasonic energy to the microphone on the mobile reader. The receipt of the ultrasonic energy at the microphone locates the mobile device. Each ultrasonic speaker 38 periodically transmits ultrasonic ranging signals, preferably in short bursts or ultrasonic pulses, which are received by the microphone on the mobile reader. The microphone determines when the ultrasonic ranging signals are received. The locationing module 36, under the control of the server 16, directs all the speakers 38 to emit the ultrasonic ranging signals such that the microphone on the mobile reader will receive minimized overlapping ranging signals from the different speakers 38. The flight time difference between the transmit time that each ranging signal is transmitted and the receive time that each ranging signal is received, together with the known speed of each ranging signal, as well as the known and fixed locations and positions of the speakers 38 on each sensing unit 30, are all used to determine the position of the microphone and of the mobile device, using a suitable locationing technique, such as triangulation, trilateration, multilateration, etc.

Another sensing system that could be used to detect a presence of a person/an object of interest is a video system operative for locating/detecting persons/objects of interest by capturing an image of a predefined field of view FOV. More particularly, the video system can be mounted in each sensing network unit 30 and includes a video module 40 having camera control and processing electronics that is connected to a camera 42 for capturing at least one image capture (e.g., one or multiple snapshots, or a video stream). In some embodiments, the camera 42 is configured to capture an image over a FOV every x number of time units (e.g., second). In some embodiments, the camera 42 is configured to capture a continuous video stream. In some embodiments, the camera 42 is configured to capture periodic video streams every y number of time units (e.g., second) with each stream lasting every z number of time units (e.g., second). With reference to these examples, the captured images/video streams may be referred to as video capture data. The camera 42 can be a high-bandwidth, moving picture expert group (MPEG) compression camera. In some implementations, the camera may have a wide-enough FOV to capture images/video over an area that is covered by more than one RDIF read-zone. In some implementations, the camera may have a FOV corresponding to a particular read-zone of a specific RFID reader. The video capture data is transmitted from the camera 42 to the server 16 for processing where image/video analysis can be employed to detect the presence of a person. In embodiments where a camera's FOV is associated with a read-zone of a particular RFID reader, the detection of a person in that camera's video capture data can signal a presence of a person in the read area of the particular RFID reader. In embodiments where a camera's FOV encompasses multiple RFID read-zones, different portions of the FOV can be associated with different RFID readers and their respective read-zones. In this case, a detection of a person in a particular portion of the FOV can signal a presence of a person in the read-zone of an RFID reader associated with the specific portion of the FOV.

It has been recognized that in many instances, while shrink events overall are dynamic, they often share certain underlying static-like characteristics/attributes. These characteristics may be the particular movement of the perpetrator where that movement is intended to avoid the attention of security personnel, movement of an item through a particular area, an association of a high-shrink item with a person that has moved through a given path or a person that has remained in one location for a predetermined threshold of time, and so on. To take advantage of these repetitive attributes, at least some embodiments of the present invention utilize the aforementioned sensing systems to generate shrink event templates which are then used to detect potential shrink events prior during or after their occurrence. In some embodiments, the generation of a shrink event template is done based on prior shrink events and the attributes associated with those events.

For example, the shrink event detection system, by way of the aforementioned sensing systems, may be configured to track movement of people and products within the venue. As described above, movement of people could be video based, and movement of products could be RFID based. Furthermore, when the system detects a person and a product moving along approximately the same path at approximately the same time or for a predetermined amount of time, an association between that person and product may be made. It will be appreciated that while recordation of individual persons can be made, a more practical approach would be to capture video data over a sufficiently wide field of view and identify individual people therethrough. Recorded video data can be retain for any predetermined amount of time, such as, for example, 12 hours, 24 hours, 48 hours, 3 days, etc. Similarly, movement of items can also be tracked and recorded, providing a path traversed by each product.

Having the recorded tracking data of products and individuals can allow the system to backtrack upon the occurrence of a shrink event and use the tracking data in the creation or update of a shrink event template. For example, a shrink event may be recognized if an individual conceals a product and carries it out of the venue while triggering the venue's RFID security gates positioned near the exit. Similarly, a shoplifting event may be recognized by a security officer conducting surveillance, whereby an individual may be caught attempting to conceal an item on his person. In other instances, a shrink event may be detected upon the inventory of items within the venue and a recognition that an available count of items is less than the count listed in the inventory. In still other instances, a shrink event may be detected when a product package is found to be tampered with and/or the item originally intended to be within the product package is damaged or missing. It will be apparent that other types of shrink events are also within the scope of this disclosure.

When a shrink event is detected, the shrink event detection system is configured to backtrack from the shrink event in order to detect one or more attributes associated with this event. This can be done by, for example, referring to the recorded video data, whereby the data can reveal a certain individual triggering the shrink event. For instance, if the event is an alarm generated by the RFID security gates positioned near the exit of the venue, a time stamp of the alarm may be correlated with a particular frame on the recorded video, revealing a particular individual walking through the gates. From there, the individual's path through the venue could be traced in reverse, providing some indication of the route traversed by the shoplifter. This route can be used as the shrink event template attribute. Similarly, any characteristic associated with this route can also be used as the template attribute. For instance, it may be recognized that the perpetrator walked with an unusually increased speed, that the perpetrator remained stationary for some particular amount of time, that the perpetrator repeatedly traversed the same portion of the path, and so on. Likewise, a detection of an RFID security tag by the RFID security gates can trigger the system to review the recorded RFID tag locationing data, providing a route traversed by the RFID tag (that is attached to a product) through the venue. As previously, this route, or any part thereof, can be considered an attribute used to create/update a shrink event template. In other instances, recorded data associated with both the individual and the item carried by the individual may be evaluated to, for example, determine the characteristic movement of the perpetrator before, during, and after the acquisition of the shoplifted item, the duration of time that the perpetrator was in possession of the stolen item, and so on.

Upon determining one or more attributes related to the shrink event, the system records these attribute in a tracking database that can be stored in the memory of the server. Thereafter, these attributes can be used in the generation or updating of shrink event templates. The system may be particularly configured to generate the templates based on various patterns that are exhibited by the shrink event attributes, and by way of machine learning analytics. For example, upon the occurrence of ten shrink events, it may be recognized that there is a discernable pattern of a perpetrator traversing a certain path, followed by a pause in movement in a location, followed by a fast movement in the direction of an exit. In another exemplary set of ten shrink events, eight of those events may indicate a pattern of a perpetrator moving back and forth between two points in the venue a number of times. It should be appreciated that any other apparent patterns may be equally considered. Recognizing these patterns can allow the system to generate a shrink event template that would compare movement of products and/or customer with the movement of products and/or customers that has a history of resulting in shrink events. From this, when the movement of a product and/or a customer tracks (substantially, exactly, or within some threshold) the pattern recorded in the shrink event template, the system can be configured to generate an alert for the security personnel that can, for example, be an auditory tone, a visual beacon, an automatic zooming in on a potential perpetrator on a video display, and so on. Similarly, other attributes can be used in the templates and in the data set evaluated against the templates.

It is worth noting that in the preferred embodiment, the generated template(s) remain dynamic in that they are updated based on occurring shrink events. This can be especially beneficial because shoplifting tactics may change and the popularity of certain products that are susceptible to shoplifting may correlate with other factors (e.g., seasons of the year). Accordingly, the system may be configured to update the shrink event template based on the change in shrink event attributes.

Figure 4:
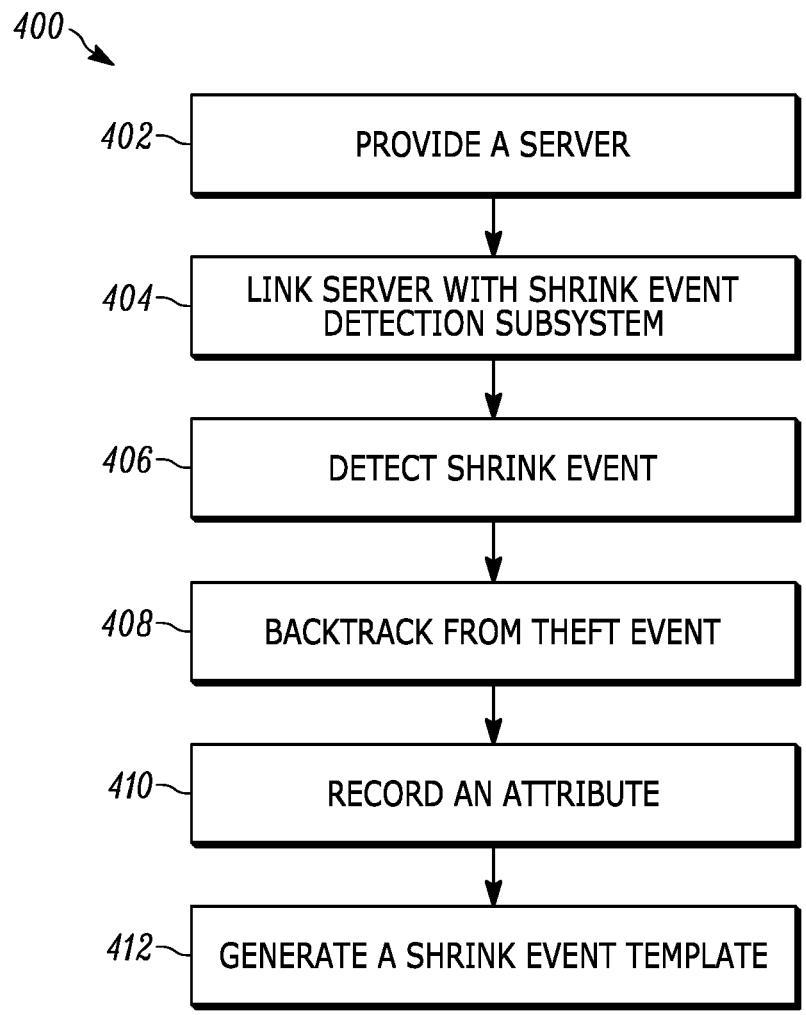
FIG. 4 illustrates a flowchart representative of an exemplary method of generating and/or updating a shrink event template.

Referring now to FIG. 4, shown therein is a flowchart representative of an exemplary method 400 of generating and/or updating a shrink event template. In step 402, the method includes providing a server associated with a venue containing a plurality of items, the server including one or more processors. In step 404 the method includes communicatively linking the server with a shrink event detection subsystem. In step 406, the method includes detecting, via the shrink event detection subsystem, a theft event of a stolen item. In step 408, the method includes backtracking from the theft event of the stolen item to recognize at least one attribute related to the theft event. In step 410, the method includes recording the at least one attribute in a tracking database, the tracking database being accessible by the server. In step 412, the method includes generating, by the server, a shrink event template based at least in part of the at least one attribute in the tracking database. It should be appreciated that generating a shrink event template may include updating an existing shrink event template.

Figure 5:
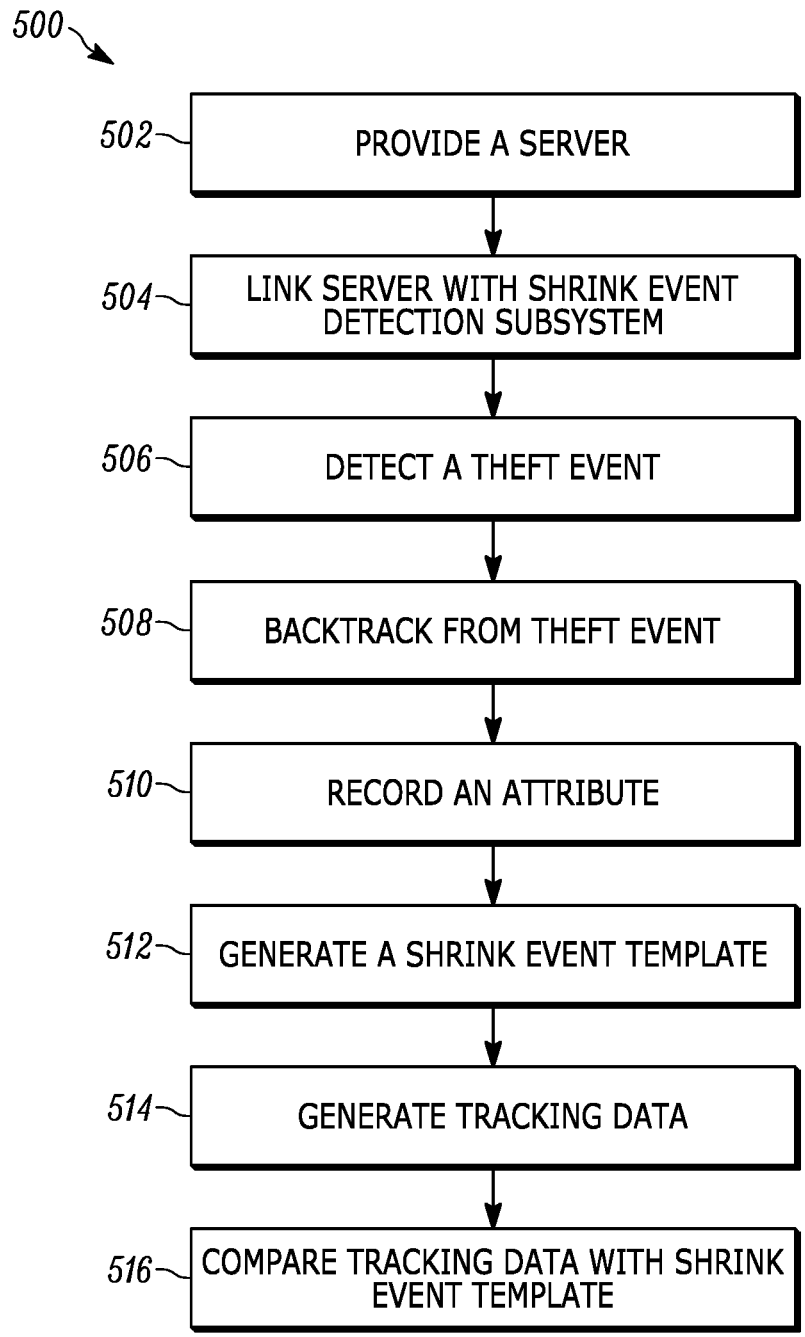
FIG. 5 illustrates a flowchart representative of an exemplary method of detecting a shrink event.

Another flowchart representative of an exemplary method 500 of detecting a shrink event is shown in FIG. 5. In step 502, the method includes providing a server associated with a venue containing a plurality of items, the server including one or more processors. In step 504 the method includes communicatively linking the server with a shrink event detection subsystem. In step 506, the method includes detecting, via the shrink event detection subsystem, a theft event of a stolen item. In step 508, the method includes backtracking from the theft event of the stolen item to recognize at least one attribute related to the theft event. In step 510, the method includes recording the at least one attribute in a tracking database, the tracking database being accessible by the server. In step 512, the method includes generating, by the server, a shrink event template based at least in part of the at least one attribute in the tracking database. In step 514, the method includes generating tracking data, via a tracking subsystem, related to at least one of tracking a person within the venue and tracking one of the plurality of items. In step 516, the method includes comparing the tracking data with the shrink event template.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having", "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A shrink event detection system for use within a venue, comprising:
    a server associated with the venue containing a plurality of items, the server including one or more processors;
    a shrink event detection subsystem that:
        detect a theft event of a stolen item;
        backtrack from the theft event of the stolen item to recognize at least one attribute related to the theft event, the at least one attribute related to the theft event including at least one of a path traversed by the stolen item prior to the theft event, a path traversed by a perpetrator of the theft event prior to the theft event, and a duration that the perpetrator of the theft event was in possession of the stolen item prior to the theft event; and
        record the at least one attribute in a tracking database, the tracking database being accessible by the server; and
    a tracking subsystem that generate tracking data related to at least one of tracking a person within the venue and tracking one of the plurality of items,
    wherein the server, via the one or more processors, generates a shrink event template based at least in part of the at least one attribute in the tracking database, the shrink event template being generated via machine learning analytics that recognizes at least one pattern based on the at least one attribute, and
    wherein the server is configured to compare the tracking data with the shrink event template.

2. The shrink event detection system of claim 1, wherein the server is further configured to generate an alert when a predefined level of correlation is detected between the tracking data and the shrink event.

3. The shrink event detection system of claim 1, wherein the tracking subsystem includes:
    at least one radio frequency identification (RFID) reader operable to track the one of the plurality of items via an RFID tag attached to the one of the plurality of items; and
    at least one video camera operable to track the person within the venue.

4. The shrink event detection system of claim 1, wherein the server generates the shrink event template to update an existing shrink event template.

5. A method of detecting a shrink event, the method comprising:
    providing a server associated with a venue containing a plurality of items, the server including one or more processors;

communicatively linking the server with a shrink event detection subsystem;

detecting, via the shrink event detection subsystem, a theft event of a stolen item;

backtracking from the theft event of the stolen item to recognize at least one attribute related to the theft event, the at least one attribute related to the theft event including at least one of a path traversed by the stolen item prior to the theft event, a path traversed by a perpetrator of the theft event prior to the theft event, and a duration that the perpetrator of the theft event was in possession of the stolen item prior to the theft event;

recording the at least one attribute in a tracking database, the tracking database being accessible by the server;

generating, by the server, a shrink event template based at least in part of the at least one attribute in the tracking database, the shrink event template being generated via machine learning analytics that recognizes at least one pattern based on the at least one attribute;

generating tracking data, via a tracking subsystem, related to at least one of tracking a person within the venue and tracking one of the plurality of items; and comparing the tracking data with the shrink event template.

6. The method of claim 5, further comprising generating an alert when a predefined level of correlation is detected between the tracking data and the shrink event.

7. The method of claim 5, wherein the tracking subsystem includes:

at least one radio frequency identification (RFID) reader operable to track the one of the plurality of items via an RFID tag attached to the one of the plurality of items; and at least one video camera operable to track the person within the venue.

8. The method of claim 5, wherein the step of generating the shrink event template includes updating an existing shrink event template.

* * * * *